Figure 1:
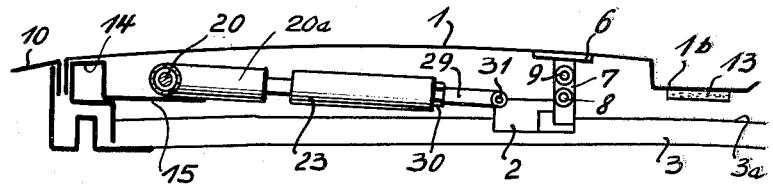

Sept. 25, 1962  H. GOLDE ET AL  3,055,701
MECHANISM FOR OPERATING SLIDING ROOFS FOR MOTOR VEHICLES
Filed July 21, 1959  4 Sheets-Sheet 1

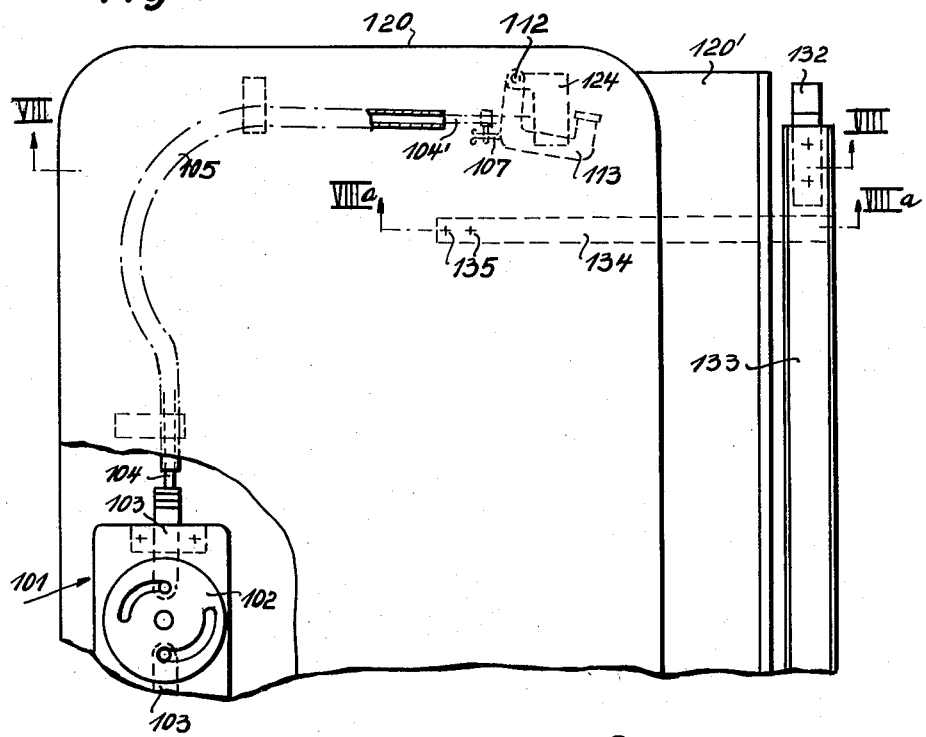
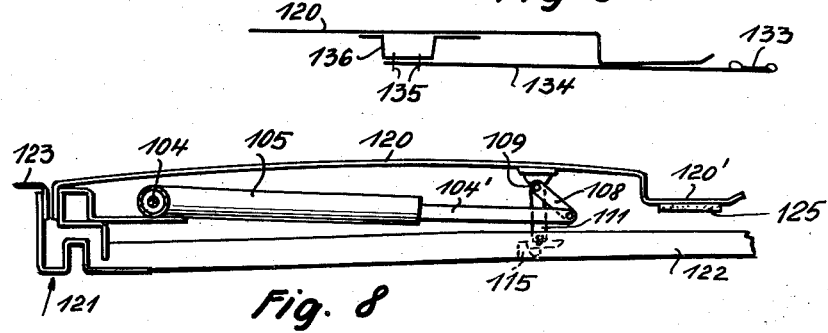

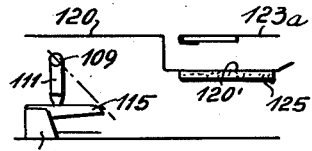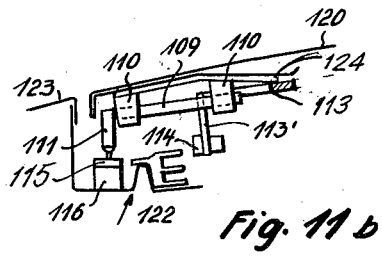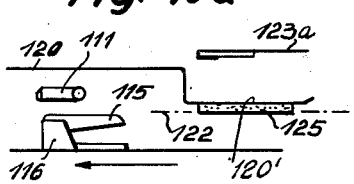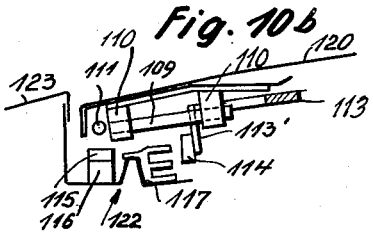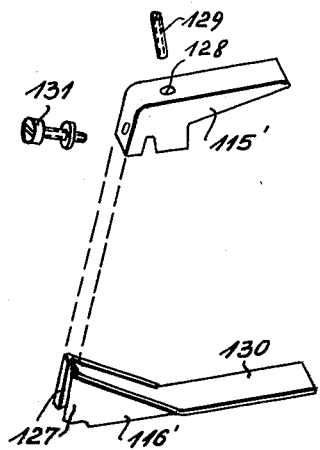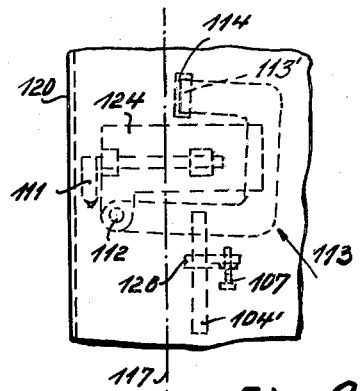

United States Patent Office 3,055,701
Patented Sept. 25, 1962

3,055,701
MECHANISM FOR OPERATING SLIDING ROOFS
FOR MOTOR VEHICLES
Hans Golde, Frankfurt, and Johannes Werner, Offenbach, Germany, assignors to H. T. Golde G.m.b.H. & Co. K.G., Frankfurt, Germany
Filed July 21, 1959, Ser. No. 828,484
Claims priority, application Germany July 22, 1958
13 Claims. (Cl. 296—137)

The invention relates to a sliding roof for motor vehicles which comprises a locking device and which also comprises lateral securing means and mean for raising the roof in the closed state.

The invention has as its object to provide a securing means which is to be operated with the locking device of the sliding roof, and means for raising the sliding roof in the closed state, these having a simplified and improved construction.

It is known to connect the securing means and the means for raising the sliding roof to the locking device. Hitherto, push rods and shaft transmission systems have been used, which press a securing attachment against a part connected fast to the vehicle roof and thus prevent the further movement of the sliding roof from a selected position as a result of vehicle vibrations and the like.

For raising the sliding roof in the closed condition, shaft transmissions have already been used with transmit the movement from the locking device to a camshaft arranged in the rear portion of the sliding roof. All these mechanisms take up a fairly considerable amount of room within the sliding roof and require a large number of component parts.

These lever mechanisms are particularly disadvantageous since the vibrations occurring in the vehicle cause them to work loose at their articulations, and to start to vibrate during the course of time. Also such lever mechanisms and shaft transmission systems tend to oscillate owing to the length of their shaft and rodding members. In both cases, after some time vehicle vibrations cause considerable rumble and other noises.

In contrast to known devices, according to the invention a cable so arranged in a guide as to be rigid to axial pressure is in each case provided as force-transmitting means between the locking mechanism and the aforesaid laterally arranged securing means and means for raising the sliding roof.

The invention provides a connection between the locking device of the sliding roof and the means for raising the sliding roof in any desired position and for raising the sliding roof in the closed position, which overcomes all these disadvantages. The invention also permits particularly expedient and simple construction of the securing means and the means for raising the roof.

In one form of embodiment of the invention there is used a means for securing the roof in any desired position and for raising the roof in a closed position wherein a lever pivotally mounted on the sliding roof is provided for a vertical movement of the sliding roof. This lever is used at the same time for raising the sliding roof in the closed position and for securing the sliding roof in any other position. This gives a particularly simple construction for the two said means and the means for transmission of force from the locking device to the two said means.

In another form of embodiment of the invention, the means for raising the sliding roof can be constructed as supporting props which are arranged at both sides of the sliding roof and are in the form of bent-over ends of short shafts which are arranged at both sides of the sliding roof, which are mounted on the sliding roof so as to be pivotable about a transverse axis of the vehicle and which each carry transversely to the shaft axis a rigid lever arm whose free end is connected in articulated manner to the cable. This form of embodiment of the invention guarantees particularly high operational reliability. The means for raising the sliding roof can be of particularly simple construction, and can be made so as to be particularly easy and simple to adjust.

In the latter form of embodiment of the invention the means for securing the sliding roof in any desired opened position can be in the form of a lever which is mounted on the sliding roof and is so pivotable by axial movement of the cable that a brake lining arranged on the lever bears against side parts of the fixed roof, for example a lateral guide rail of the sliding roof. An adjustable short entrainment element is preferably provided on the cable for the operation of the securing lever or brake lever, so that the braking action is variable by appropriate adjustment of the element.

In order to achieve a particularly good braking effect, in both forms of embodiment of the invention the abutment surface fast with the roof and associated with the brake lining can be profiled so as to provide increased friction. As a result, lateral securing of the sliding roof is achieved in contrast to braking devices wherein a brake lining consisting generally of soft material such as felt, leather or the like bears against smooth or polished surfaces, so that considerable braking forces are necessary to guarantee secure adhesion of the lining to the smooth bearing surface when the vehicle is subjected to vibrations.

Figure 2:
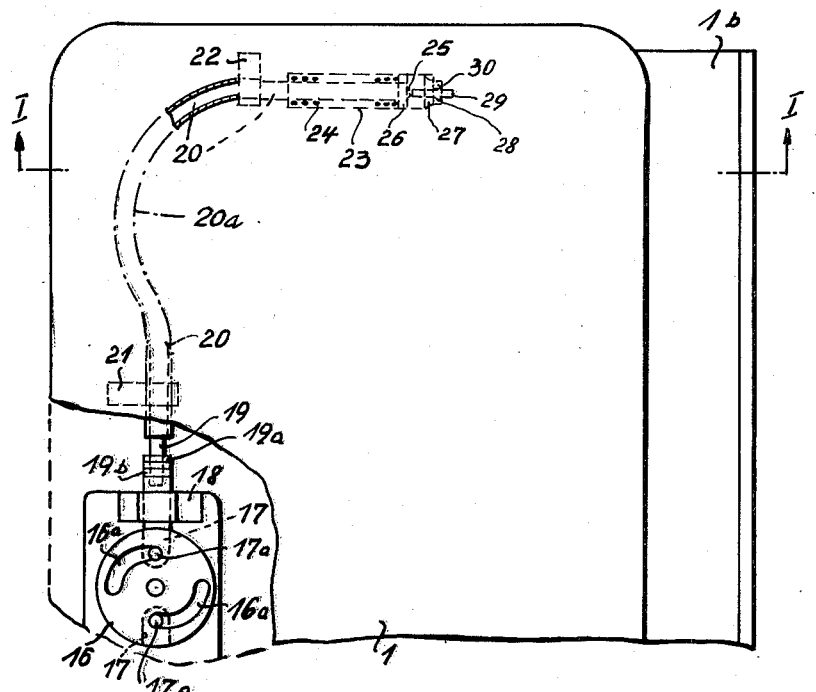
Figure 3:
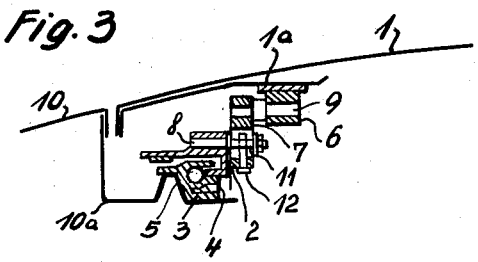
Figure 4:
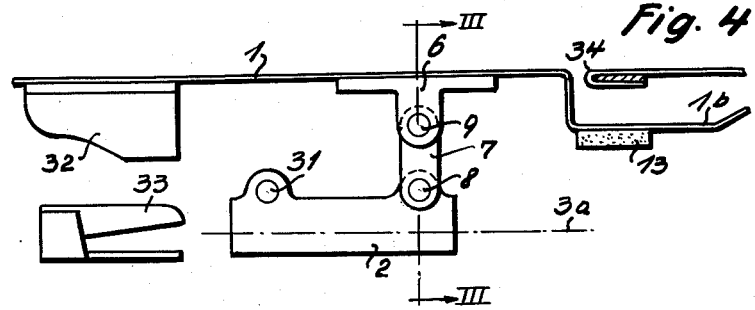
Figure 5:
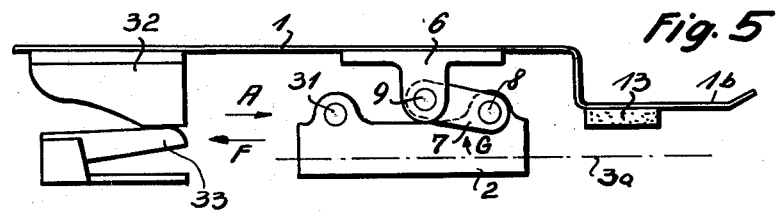
Figure 6:
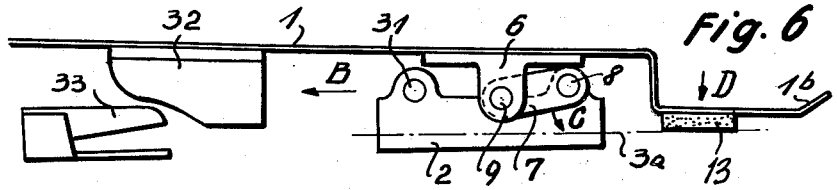

Some examples of embodiment of the invention will be explained in more detail hereinafter with reference to the drawings, wherein:

FIGURE 1 is a longitudinal sectional view of one form of embodiment of the sliding roof according to the invention at the height of the guide rail and on the line I—I of FIGURE 2, FIGURE 2 is a plan view of a sliding roof according to FIGURE 1, part being broken away in order to illustrate the operation of the locking device, FIGURE 3 is a sectional view taken on the line III—III of FIGURE 4, FIGURE 4 is a side view of the rear pivotable link in the closed position, FIGURE 5 is a view similar to FIGURE 4 in the raised position shortly before the raising of the rear edge, FIGURE 6 is a view similar to FIGURES 4 and 5 in the displacement position, FIGURE 7 is a plan view, partly broken away, of a rigid sliding roof in a second form of embodiment of the invention, FIGURE 8 is a sectional view taken on the line VIII—VIII of FIGURE 7, wherein the front and lateral sliding roof frames are also shown and wherein the securing means according to FIGURE 7 has been omitted in order to simplify the drawing, FIGURE 8a is a sectional view taken on the line VIIIa—VIIIa of FIGURE 7, FIGURE 9 is a partial view of FIGURE 7 on a larger scale, FIGURES 10a and 10b are side and front views respectively of some details of FIGURE 9, FIGURES 11a and 11b show the same parts as in FIGURES 10a and 10b but in another working position, FIGURE 12 shows an adjustable ramp in an exploded view.

In the form of embodiment according to FIGURES 1-6, a sliding roof 1 is mounted displaceably on a guide rail 3 by means of guide elements 2 of which FIGURE 1 shows only the rear guide element. As shown in FIGURE 3, a soft intermediate layer 4 is situated between the guide element and the guide rail. The rail 3 also comprises a recess 5 which in the case of an automatic roof drive receives the driving cable. Situated between the guide element 2 and a supporting piece 6 connected to the sliding roof 1 by means of a connecting flange 1a is a link 7 which is pivotally mounted by means of pivot pins 8 and 9 on the guide element 2 and the supporting piece 6. At 10 a portion of the fixed vehicle roof is shown in FIGS. 1 and 3.

For bringing the sliding roof into exact alignment, when in the closed state, with the fixed vehicle roof or the rear roof aperture edges 34, as FIGURE 3 shows, the element constituting the link carrying the pivot pins 8 and 9 is provided with a slot 11 to which the pivot pin 8 is fixed. For fixing and adjusting the pivot pin 8 in the slot 11 there is provided an adjusting screw 12 which extends through a tapped hole in the part of the pivot pin 8 mounted in the slot 11. At its rear end, the pivot pin 8 is also provided with a screw thread on which is screwed a nut for tightening the pin 8 fast on the link element. In this way, the spacing between the pivot pins 8 and 9 can be adjusted. The guide rail 3 is arranged on a fixed roof frame 10a, so that the adjustment of the spacing between the hinge pins 8 and 9 adjusts the height of the sliding roof 1 relatively to the fixed roof part.

FIGURES 1 and 2 also show an extension 1b which is attached to the sliding roof or is made in one piece therewith and which, when the sliding roof is closed, serves as a rain-collecting gutter and at the same time to seal the sliding roof relatively to the fixed vehicle roof from the inside. Arranged on this extension above the guide rails is a lining 13 consisting of felt, leather or the like, and serving as a buffer element. The lining is adapted to bear upon an upper edge 3a of the guide rail 3.

Arranged on the front edge of the sliding roof, on a transverse bar 14, is a base plate 15 which carries the locking mechanism. This mechanism is connected to a cam disc 16. Pins 17a which are mounted on push rods 17 engage in guide tracks 16a. These push rods are mounted to be longitudinally displaceable in guides 18. Fixed to the push rods by means of a threaded part 19 are cables 20 which are guided in tubular sleeves 20a so as to be rigid against axial pressure, in such a manner that after nuts 19a and 19b are released the lengths of the cables 20 can be accurately adjusted.

These cables pass through guides 21 and 22 provided in the proximity of the side edges of the sliding roof, where the cables terminate in sleeves 23, in which coil springs 24 are arranged. Each cable end is connected by a threaded member 25 to a fixing means 26 which is displaceable on the sleeve 23 and which bears against one end face of the coil spring 24. The sleeve 23 comprises a closure piece 27 in which is situated a central tapped hole 28. This tapped hole receives one end of a push rod 29 which is additionally secured by means of a nut 30.

The other end of the push rod 29 is connected to the guide element 2 by way of a pivot pin 31.

Also fixed to the sliding roof 1 in the vicinity of the link is a lifting-out projection 32 which near the closed position of the sliding roof runs on to a ramp 33 and thus raises the sliding roof by a slight amount so that the final raising of the rear sliding roof edge is initiated.

The method in which the sliding roof constructed according to the invention in this manner operates is as follows:

When, with the sliding roof in the closed state, the locking device is operated to release the locking arrangement with the fixed vehicle roof, at the same time by means of the cable 20 the guide element 2 is brought from the position shown in FIGURE 4 into the position shown in FIGURE 5. At the same time, the link 7 swings downward until the position shown in FIGURE 5 is reached, i.e., until the projection 32 runs on to the ramp 33. When the sliding roof is displaced in the direction of the arrow A in FIGURE 5, it falls again into the position shown in FIGURE 6 until the buffer lining 13 bears on the upper edge 3a of the guide rail.

It should be mentioned here that this lining 13 does not necessarily have to be connected to the extension 1b of the sliding roof, but can be arranged at any other appropriate point in the vicinity of the rear edge of the sliding roof, in such a manner that it preferably comes into contact with the guide rail, since the latter being an element extending over the entire length of the path of guidance is best suited for the purpose of this braking device.

After the opening of the roof to its desired position, the sliding roof is to be secured in the position to which it has been placed so that it will not move out of position during travelling as a result of vibrations. For this purpose, according to the invention, there is provided the securing means which is operatively connected to the locking device. In the case of the sliding roof according to the invention, this securing means operates in the following manner:

The control handle is turned into its locking position. During this movement, the cam disc 16 is entrained and the pins 17a are pulled over an elliptical path of travel in the direction of the centre point of the cam disc into an end position shown in FIGURE 2. By means of the disc 16, the cable 20 tensions the spring 24. Since in this position the lining 13 is already bearing fast on the upper edge 3a of the guide rail, the spring tends to pull the guide element 2 further in the direction of the arrow B. There occurs at the link 7 a torsional moment in the sense of the arrow C, which presses the rear edge of the sliding roof in the direction of the arrow D downwardly and thus brakes or secures the sliding roof in the adjusted position.

If the sliding roof is to be brought back to the closed position again, first of all the locking handle is again turned into the open position and the sliding roof is pulled forwards in the direction of the arrow B. In so doing, it comes into the position shown in FIGURE 6 and the lifting-out projection 32 runs on to the ramp 33, as FIGURE 5 shows, until the front edge of the sliding roof comes into contact with the front edge of the roof aperture. If then the locking handle is operated, the two above-mentioned edges are drawn tightly against one another simultaneously with the locking of the sliding roof to the fixed roof. At the same time, however, the cam disc 16 is also rotated so that the cable carries out a movement in the direction of the arrow F (FIGURE 5) and in so doing the rear guide element 2 is also drawn forwards somewhat.

It will be seen that in the position of the link shown in FIGURE 6 the connection between sliding roof and guide element is completely rigid in the direction of displacement of the sliding roof. After the lifting out operation shown in FIGURE 5 a movement of the guide element in the direction of the arrow F produces at the link 7 a torque in the direction of the arrow G which brings this link 7 into the position shown in FIGURE 4 and thus brings the rear edge of the sliding roof to the height of the rear portion of the fixed vehicle roof 34.

The pre-loading of the spring 24, which is adjustable by means of the tapped hole 28 and the nut 30, is sufficient to advance the guide element 2 into the position shown in FIGURE 4. This pre-loading is so chosen that upon operation of the locking handle in the open position of the sliding roof it can be overcome and then brings about the buffer-braking effect.

Also in the embodiment according to FIGURES 7 to 12 there is arranged in the centre of the front of the sliding roof a conventional locking device 101 which can be operated by hand or electrically if appropriate. Connected to the locking mechanism is a cam disc 102 which by means of a pin and slot guide system displaces two push rods 103. Connected to each push rod 103 is a cable 104 which is guided so as to be rigid to axial pressure in a guide, for example a tubular sleeve 105. The cable guide sleeve 105 is laid in an appropriate manner on the underside of the sliding roof and is adapted to the curvature thereof.

The end 104' of the cable 104 is hingedly connected to a lever arm 108 which is arranged rigidly on a short shaft 109. The other end 11 of the shaft 109 is bent-over forwardly and is used as a prop for lifting a sliding roof 120. The short shafts 109 mounted in both sides of the sliding roof thus replace, in a construction according to the invention, the transverse shaft with bent-over ends which extended over the entire width of the sliding roof and was used conventionally in older known constructions. FIGURE 7 shows clearly that with a construction according to the invention the greater part of the underside of the sliding roof is left free of fittings which is particularly advantageous if it is desired to arrange a transparent portion in the sliding roof.

FIGURE 8 shows, in cross-section, a front sliding-roof frame 121 and a lateral frame part 122. The sliding roof 120 itself is shown here in the forward end position, in the raised state, wherein the bent-over prop 111 bears on a ramp 115 arranged on the lateral frame part 122. A fixed vehicle roof 123 surrounding the roof aperture is also indicated in the drawing, as well as a rain-collecting gutter 120' constituted by the rear portion of the rigid sliding roof, which always remains below the fixed roof portion.

FIGURE 11a shows the prop 111 and the ramp 115 attached to a base portion 116 in side view and in the position shown in FIGURE 8, whereas FIGURE 11b shows the same parts in the same position and viewed from the front, and also some other parts amongst which is a sheet metal support 124 which is fixed rigidly to the sliding roof 120 and on which two bearings 110 are fixed for the shaft 109. Numeral 123a denotes the rear portion of the fixed vehicle roof.

FIGURES 10a and 10b show the same parts as FIGURES 11a and 11b, but with the sliding roof 120 lowered. the lowering is carried out under the action of the sliding roof's own weight, as soon as the prop 111 by means of the cable 104 (see FIGS. 7 and 8), the crank arm 108 and the shaft 109 are brought into the horizontal position shown in FIGURES 10a and 10b. Then a buffer 125 arranged on the sliding roof end 120' slides on the lateral roof frame 122 or a guide rail 117 fixed thereto. In this position, the sliding roof 120 can be displaced forwardly and rearwardly as desired in the vehicle.

In order to secure the sliding roof 120 in any desired intermediate position or in the rear end position, according to the invention a brake lever 113 which can be constructed in any desired appropriate and known manner is so provided that it lies in the path of the cable 104. For this purpose, an entrainment element 107 is so arranged on the cable end 104', as shown in FIGURE 7, that when it impinges on the brake lever 113 it turns the latter about its pivot 112. The brake lever 113 is substantially U-shaped and is mounted at its end to be pivotable about the pin 112 on the support 124, whereas the other end 113' of the brake lever is bent-over downwardly and carries a brake lining 114.

The entrainment element 107 consists of an axially adjustable screw. It is mounted in a holder 126 which is rigidly fixed on the cable end 104', for example being clamped fast in position. If appropriate, the holder 126 can also be arranged at any other desired position on the cable 104, if the cable guide sleeve 105 comprises a corresponding slot for the passage of the holder 126. In this case, of course, the brake lever 113 must be correspondingly shifted so that it is impinged upon by the entrainment element 107. By adjusting the screw element 107 the exact spacing of the entrainment element from the brake lever 113 and thus the braking force exerted by the brake lining 114, can be regulated as desired.

When, by means of the cam disc 102, the cable 104 according to FIGURE 8 is displaced towards the right, the entrainment element 107 (FIGURE 9) impinges on the brake lever 113 and pivots the latter in counter-clockwise direction. At the same time, the prop 111 is pivoted downwardly. If when the cable 104 is operated in this way the sliding roof 120 is situated in the forward end position according to FIGURE 8, the prop 111 mounts the ramp 115 and lifts the sliding roof 120 with the brake lever 113 upwards, so that the brake lining 114 according to FIGURE 11b does not make operative contact.

The pivoting movement of the prop 111 presses the sliding roof 120 not only upwards but also forwards so that its front edge bears in sealing-tight manner against a forward fixed roof portion 123. If on the other hand, the sliding roof 120 is in a position other than the forward closed position, when the cable 104 is operated in the same sense the prop 111 does not impinge on the ramp 115 but carries out an idle movement. The sliding roof 120 is not lifted and the pivoting of the brake lever 113 effected at the same time by means of the entrainment element 107 at the cable end 104' brings the brake lining 114 to bear fixedly against the guide rail 117 so that the sliding roof 120 is held fast in the relevant position.

The surface of the guide rail 117 which is acted upon by the brake lining 114 can be so treated or profiled, where appropriate, that the friction between the brake lining 114 and the rail 117 is increased, i.e. sliding of the brake lining is rendered difficult. Depending on the configuration of the lateral roof frame 122 and the guide rail 117 which is used, the brake lever 113 can also be so constructed that the brake lining 114 bears directly against the roof frame 122.

The ramp 115 can be constructed in any suitable desired manner. In the example shown it consists of a base portion 116 to which the actual bearing surface 115 is fixedly arranged. Expediently, however, the bearing surface 115 is arranged to be adjustable relatively to the base portion 116, as is shown for example with reference to FIGURE 12.

In the ramp according to FIGURE 12, a base portion 116' is provided with a guide 127, which is inclined slightly upward, for a ramp 115'. Axially adjustable in a substantially vertical bore 128 in the ramp 115' is a grub screw 129 which bears against a base plate 130 of the base portion 116'. After the setting of the desired ramp height by means of the screw 129, the two ramp portions 115' and 116' are secured in their positions relatively to one another by a clamping screw 131.

In order to keep the guides of a rigid sliding roof always in engagement in the guide rails, which is important if damage to the sliding roof is to be prevented, guides 132 are provided on a guide carrier 133 which has arms 134 of sheet steel which at their front ends are connected fast by spot welds 135 to the sliding roof through the agency of fastening elements 136. These arms permit vertical pivoting movement of the guide carrier 133 relatively to the sliding roof 120 about the connection 135, whereby the guides 132 can always remain in engagement with guide rails 117 mounted laterally on the roof frame 122 (FIGURE 10b), so that the sliding roof can carry out a vertical movement relatively to the guide carrier 133 at opening and closing.

The invention is of course not restricted to details which have been described. More particularly, the kind of locking device 101 arranged on the front part of the sliding roof is not important to the present invention, as long as an operative connection is provided between the locking device and an axial displacement of the cable 104. If appropriate, the connection of the cable to a driving part, such as the push rods 103, of the locking device 101, can be made adjustable as to length, for example by means of screwthreading.

We claim:

1. A sliding roof structure for a motor vehicle having a fixed roof portion including stationary longitudinal guide members and abutments at the upper portions of said guide members, comprising, in combination, a rigid sliding panel, guide means secured to said panel and adapted to be displaced along said guide members, a latching mechanism at the forward portion of said panel, a laterally positioned securing mechanism including a brake lining mounted on said panel, actuating means for urging said lining against said abutments, laterally arranged means for raising said panel from a lower sliding position to an upper closed position with said guide means maintaining sliding engagement with said guide members, said raising means comprising linking means pivoted on said panel and a ramp fixed to the roof structure and cooperating with said linking means for raising said panel only when the latter is near its foremost position thereby lifting said lining out of the region of said abutments, a cable connected with one of its end portions to said actuating means and to said linking means while said latching mechanism is operatively connected to the opposite end portion of said cable for axial movement thereof, whereby movement in a direction for raising said panel to said closed position normally causes said actuating means to urge said lining against said abutments and whereby movement in the opposite direction, for lowering said panel to said sliding position, returns said actuating means and said linking means to their inoperative positions, and a guide sleeve surrounding said cable and guiding the latter rigid to axial pressure for translation of its motion in two directions.

2. A sliding roof structure according to claim 1, wherein said raising means includes a rear guide element, said vehicle having a frame providing a supporting track for said rear guide element, a link having two pivot pins connecting rear guide element with said panel, the pivot pin connected to said panel being positioned slightly lower than the pivot pin connected to said rear guide element in the open position of said panel, a coupling between said rear guide element and said cable including an interposed spring whereby operation of said cable outside of the operative range of said ramp presses said panel downward in opposition to spring action and thus presses said lining against the motor vehicle.

3. A sliding roof structure according to claim 2, wherein said link has an adjustable length.

4. A sliding roof structure according to claim 1, further comprising a second guide element extending along the rear of said cable, a plate fastened to said rear end and being slidably mounted in said second guide element, a spring interposed between the forward end of said second guide element and said plate, and a rigid member connecting said latching and said securing mechanisms to said second guide element and extending into abutment with said plate, whereby a pushing force on said cable is transmitted to said rigid member through said plate, while a pulling force on said cable is conveyed to said rigid member via said spring and said second guide element.

5. A sliding roof structure according to claim 4, wherein said rigid member is threaded into said second guide element for adjustably positioning said rigid member and adjusting the pre-loading of said spring.

6. A sliding roof structure according to claim 1, wherein said ramp consists of two parts, one part being fixed to the vehicle roof frame and forming an abutment for a camming surface of the other part which is inclined relatively to the direction of sliding of said panel, said other part being connected to said panel and serving as a lifting means when said panel is pulled forward near to said closed position.

7. A sliding roof structure according to claim 1, wherein said actuating means has a bracket fixed to said cable and an axially adjustable bolt carried by said bracket with the axis of said bolt being parallel to the axis of said cable, said lining being fixed to a lever pivoted to said panel and positioned in the path of said bolt.

8. A sliding roof structure according to claim 7, wherein said lever is pivotally mounted on a second bracket carrying said linking means.

9. A sliding roof structure according to claim 1, wherein said linking means includes a prop in the form of a bent-over end of a short shaft arranged laterally on said panel and mounted pivotally about a transverse axis of the motor vehicle on said panel, a rigid lever arm connecting said short shaft with said cable.

10. A sliding roof structure according to claim 9, wherein said prop in its inoperative position is directed substantially parallel to said cable and in a forward direction.

11. A sliding roof structure according to claim 1, further including rear guide elements, said motor vehicle having a guide frame for supporting said guide elements, and vertically flexible arms connecting said guide elements to the rear edge of said panel, whereby said rear edge may be raised without lifting said guide elements from said guide frame.

12. A sliding roof structure according to claim 1, wherein said securing mechanism locks said panel in any open position and includes a lever pivotally mounted on said panel, a friction lining on said lever, and means operatively connecting said lever to said cable for causing an axial movement of the latter to move said friction lining against a fixed portion of the motor vehicle.

13. In a sliding roof structure, the combination of a rigid sliding panel, a ramp for raising said panel near to its foremost position, said ramp comprising an upper and a lower part, a portion of said upper part forming an abutment for a surface fast with said panel, said lower part hving a guide portion inclined slightly upward and adapted to be slidingly connected with an engaging portion of said upper part, an adjusting screw in said upper part adjustable in height with regard to said lower part, said screw bearing against a base portion of said lower part, and a clamping screw for immobilizing said guide portion and said engaging portion with respect to each other in the desired vertical position of said ramp.

References Cited in the file of this patent

UNITED STATES PATENTS

| 2,036,485 | Lintern et al. | Apr. 7, 1936 |
| 2,156,615 | Bishop | May 2, 1939 |
| 2,606,625 | Paton | Aug. 12, 1952 |
| 2,661,234 | Bishop | Dec. 1, 1953 |

FOREIGN PATENTS

| 656,021 | France | Dec. 24, 1928 |
| 400,377 | Great Britain | Oct. 26, 1933 |
| 751,332 | Great Britain | June 27, 1956 |